United States Patent
Shin

(10) Patent No.: US 9,176,540 B2
(45) Date of Patent: Nov. 3, 2015

(54) ELECTRONIC DEVICE HAVING AUDIO OUTPUT UNIT

(71) Applicant: Samsung Electronics Co., Ltd., Gyeonggi-do (KR)

(72) Inventor: Yun-Sung Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 384 days.

(21) Appl. No.: 13/657,948

(22) Filed: Oct. 23, 2012

(65) Prior Publication Data

US 2013/0114840 A1    May 9, 2013

(30) Foreign Application Priority Data

Nov. 7, 2011  (KR) .......................... 10-2011-0115175

(51) Int. Cl.
| | |
|---|---|
| *H04R 1/02* | (2006.01) |
| *G06F 1/16* | (2006.01) |
| *H04M 1/03* | (2006.01) |
| *H04M 1/18* | (2006.01) |

(52) U.S. Cl.
CPC ............ *G06F 1/1688* (2013.01); *G06F 1/1658* (2013.01); *H04M 1/035* (2013.01); *H04M 1/185* (2013.01)

(58) Field of Classification Search
None
See application file for complete search history.

(56) References Cited

U.S. PATENT DOCUMENTS

| | | | |
|---|---|---|---|
| 5,097,513 A * | 3/1992 | Jordan et al. ................... | 381/160 |
| 6,671,171 B1 | 12/2003 | Homer et al. | |
| 2005/0167136 A1 | 8/2005 | Centofante | |
| 2007/0223756 A1* | 9/2007 | Nielsen .......................... | 381/322 |
| 2007/0291961 A1* | 12/2007 | Shin .............................. | 381/111 |
| 2008/0102904 A1* | 5/2008 | Kang et al. .................. | 455/575.1 |
| 2008/0316864 A1* | 12/2008 | Klein ............................. | 367/138 |
| 2009/0325653 A1* | 12/2009 | Kim et al. ................... | 455/575.1 |
| 2011/0164767 A1 | 7/2011 | Goel et al. | |
| 2012/0048643 A1* | 3/2012 | Barnes .......................... | 181/145 |
| 2012/0300969 A1* | 11/2012 | Tanaka et al. ................. | 381/355 |

FOREIGN PATENT DOCUMENTS

| | | | | |
|---|---|---|---|---|
| EP | 0886457 A1 | 12/1998 | | |
| EP | 1519617 A2 * | 3/2005 | ............... | H04R 1/28 |
| GB | 822650 * | 10/1959 | | |
| KR | 10-2005-0056808 A | 6/2005 | | |
| KR | 10-2006-0114025 A | 11/2006 | | |
| KR | 10-0703484 B1 | 4/2007 | | |
| KR | 10-0810375 B1 | 2/2008 | | |
| KR | 20-2010-0000706 U | 1/2010 | | |
| KR | 10-2010-0058337 A | 6/2010 | | |
| KR | 10-2010-0062078 A | 6/2010 | | |
| KR | 10-2010-0132575 A | 12/2010 | | |
| WO | 2011/046361 A2 | 4/2011 | | |
| WO | WO 2011093157 A1 * | 8/2011 | ............... | H04R 1/40 |

* cited by examiner

*Primary Examiner* — Wayne Young
*Assistant Examiner* — Mark Fischer
(74) *Attorney, Agent, or Firm* — Cha & Reiter, LLC

(57) ABSTRACT

An electronic device having an audio output unit with case design that provides a wide resonance space for enhanced sound quality and improved shock resistance is provided. The electronic device includes a housing, a first space longitudinally penetrating a side region of the housing, and a second space connected to the first space and configured to accommodate an audio output unit therein.

18 Claims, 5 Drawing Sheets

ELECTRONIC DEVICE HAVING AUDIO OUTPUT UNIT

CLAIM OF PRIORITY

This application claims the benefit of priority under 35 U.S.C. §119(a) from an application entitled "Electronic Device Having Audio Output Unit" filed in the Korean Intellectual Property Office on Nov. 7, 2011 and assigned Serial No. 10-2011-0115175, the contents of which are hereby incorporated by reference in its entirety.

BACKGROUND OF THE INVENTION

1. Field of the Invention

The present invention relates to an electronic device having an audio output unit. More particularly, present invention relates to an electronic device having an audio output unit and issues related to audio speakers in portable electronic devices.

2. Description of the Related Art

In general, portable electronic devices refer to devices that are carried by a user and allow the user to access a variety of content, such as portable terminals, MP3 players, Portable Multimedia Players (PMPs), electronic books, Personal Digital Assistants (PDA's), tablets and the like.

The proliferation of such portable electronic devices has become more diversified over time in terms of form factors according to purposes thereof, periodical changes, the demands of consumers, and the like. Recently, use of bar type portable terminals containing a variety of functions, such as smart phones or tablet PCs, is increasing.

Portable electronic devices are frequently used while in motion due to easy portability thereof and various functions loaded therein. However, the use of such devices while the user is in motion causes a number of problems, such as damage to portable electronic devices when they fall, bend, twist or the like depending on environments in which portable electronic devices are carried, and other deformations. Such devices can be left in automobiles and exposed to extreme heat or cold, and used outdoors in the rain, etc., thereby stressing nearly all aspects of operation of these portable electronic devices.

In an attempt to solve some of the above-described problems, various technologies have been developed. In one example, during injection molding of a case for portable electronic devices, reinforcing ribs may be formed at opposite side surfaces of the case, or reinforcing members may further be installed. Related technology with regard to installation of the reinforcing members is disclosed in, for example Korean Patent Registration No. 10-0810375 (registered on Feb. 27, 2008 and entitled "Reinforcing Device for Slim Portable Terminal").

In another example, the materials used by manufacturers to construct the cases of portable electronic devices have changed from polycarbonate (PC) to composites of polycarbonate and glass fiber (GF), polyphthalamide or the like, in order to reinforce the cases of the portable electronic devices. Related technology with regard to this material change is disclosed in Korean Patent Laid-Open Publication No. 10-2010-0058337 (published on Jun. 3, 2010 and entitled "Painting Composition for Portable Electronic Device and Painting Method Using the Same").

However, even if reinforcing ribs are formed at opposite side surfaces of a case of a portable electronic device during injection molding of the case, the rigidity of the case is not greatly increased, e.g., increased by about 10%, and thus, the reinforced-rib case still may be easily deformed due to an external force.

Moreover, due to the fact that the reinforcing ribs are densely formed at opposite side surfaces of the case, the mold may be subjected to undesirable engagement during injection molding of the case. Additionally, since the interior space of the case provided with the densely formed reinforcing ribs essentially constitutes a dead space in which other components cannot be mounted, there isn't much space left for components within the case, and this wasted space makes it difficult to perform the subsequent mounting of additional components within the case.

In the scenario in which the material of a case is changed by the manufacturer to achieve increased rigidity, for example, if a polycarbonate composite containing glass fiber of 50 wt % or more is used, the case may exhibit lower shock resistance, although the rigidity of the case is greatly increased, which may frequently cause damage, such as cracks and the like, due to shock.

In addition, the use of glass fiber content proportionally increases the difficulty of painting the case. In particular, if the glass fiber is exposed to the outside due to abrasion damage to the case, the glass fiber has a high possibility of causing the user to have itchy skin.

Nowadays, an audio function has become an important function of portable electronic devices, particularly as multimedia messages are becoming more common, and a speaker has been mounted in the case to output sound to the outside of the device. However, since space for installation of the speaker, as well as resonance of sound generated from the speaker, is restricted due to the thickness or size of portable electronic devices and various functional components thereof, there is a problem in that the transmission distance of sound output from the speaker is short.

SUMMARY OF THE INVENTION

Accordingly, an exemplary aspect of the present invention is to address at least some of the above-mentioned problems occurring in the prior art, and to provide an electronic device having the advantages as described herein below. The present invention provides an audio output unit in which a housing of the electronic device has an increased rigidity and can provide an increased resonance space for the audio output unit, resulting in enhanced sound quality.

In accordance with an exemplary aspect of the present invention, there is provided an electronic device having an audio output unit, preferably including a housing, a first space longitudinally penetrating a side region of the housing, and a second space connected to the first space and configured to accommodate the audio output unit therein.

The housing, which has a first space therein, longitudinally penetrates a side region of the housing; and a rib that vertically protrudes from an upper surface of the housing to define a periphery of a second space arranged in a substantially lateral direction long the upper surface of the housing and communicating with the first space, wherein said second space is configured to receive the audio output unit arranged therein.

The first space may include at least one space defined within an empty space (i.e. along an unused edge) of the housing.

The first space may be integrally formed with the housing by injection molding or gas injection molding.

The first space may comprise a reinforcing space, and the electronic device may further include a reinforcing member to reinforce the housing.

The reinforcing member may be integrally formed with the first space such that an outer circumference of the reinforcing member comes into relatively close contact with the first space and an inner circumference of the reinforcing member defines a hollow to be connected to the second space.

The reinforcing member may be inserted into the first space upon injection molding of the first space so as to be integrally formed in the first space by double injection molding.

The outer circumference of the reinforcing member may be provided with at least one positioning guide to position the reinforcing member in the first space.

The reinforcing member may be formed, for example, of a stainless steel (SUS) based metallic material.

The housing may be provided with a printed circuit board, and the electronic device may further include a sound leakage-prevention material interposed between the printed circuit board and the second space to hermetically seal the second space.

The sound leakage preventing material may include an elastic material.

In accordance with another exemplary aspect of the present invention, there is provided an electronic device having an audio output unit, including a housing having spaces defined in the housing, wherein the spaces include a first space longitudinally penetrating an empty space defined along a periphery of the housing and a second space connected to the first space and configured to accommodate the audio output unit therein, and a reinforcing member provided in the first space to reinforce the housing, the reinforcing member being connected to the second space.

The spaces as arranged serve as a resonance space in which sound output from the audio output unit resonates.

The reinforcing member may preferably include a reinforcing member housing configured to come preferably into substantial contact with the first space, and a bore defined in the reinforcing member housing and connected to the first space.

The reinforcing member housing may be provided at either side of the housing and the bore can be connected to one end of the second space to allow sound generated from the audio output unit to resonate in the second space and the bore.

The reinforcing member may be positioned, for example, in the first space upon injection molding, so as to be subjected to double injection molding.

An outer circumference of the reinforcing member housing may be provided with at least one positioning guide configured secured to a mold upon injection molding so as to position the reinforcing member housing in the first space.

The reinforcing member may be formed of a stainless steel (SUS) based metallic material.

The housing may be provided with a printed circuit board that is arranged therein, and the electronic device may further include a sound leakage preventing material interposed between the printed circuit board and the second space to hermetically seal the second space.

The sound leakage preventing material may include an elastic material.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Figure 1:
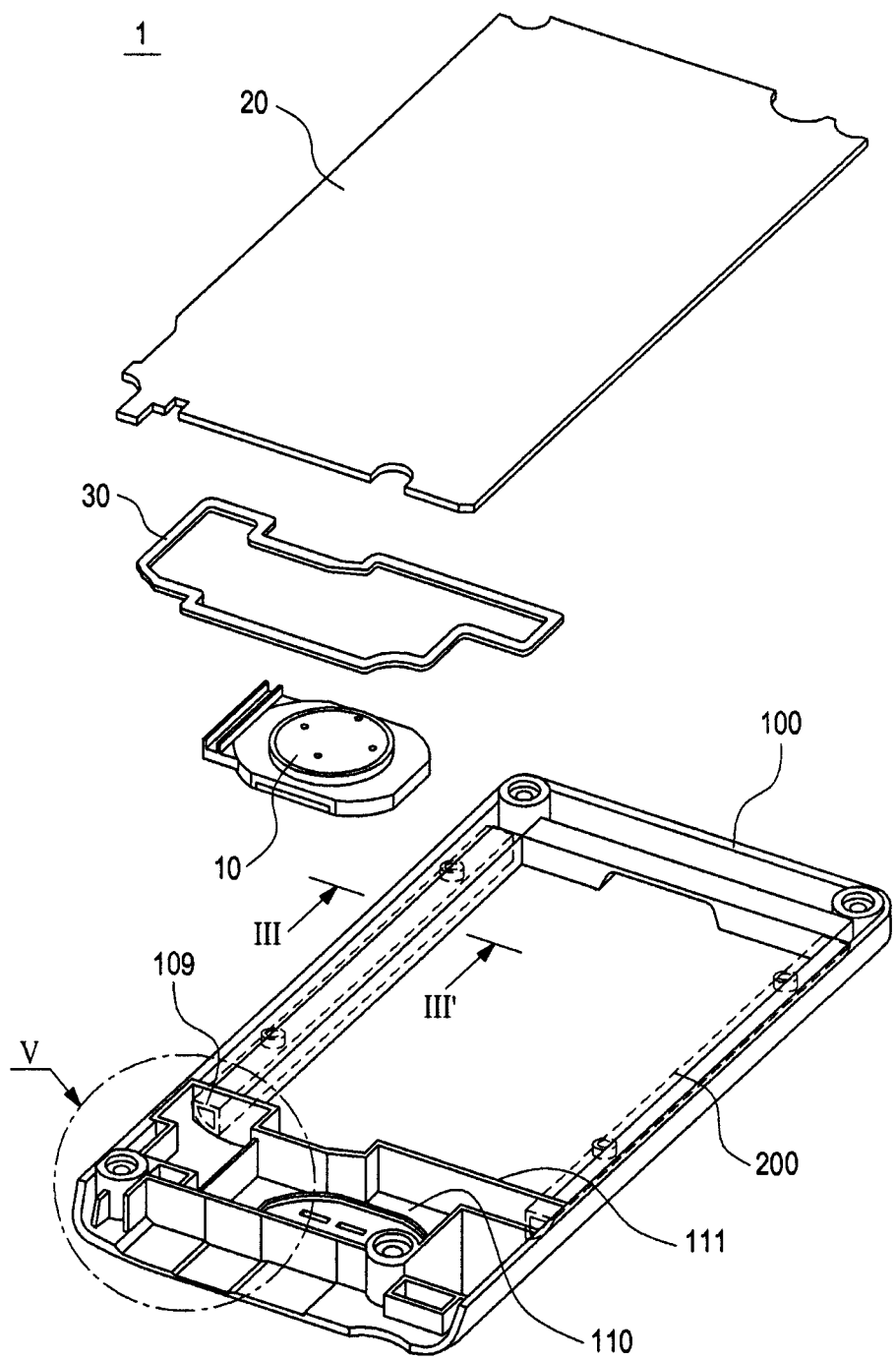
FIG. 1 is an exploded perspective view schematically illustrating an electronic device having an audio output unit according to an exemplary embodiment of the present invention.

Hereinafter, an exemplary embodiment of an ELECTRONIC DEVICE HAVING AN AUDIO OUTPUT UNIT according to the present invention will be described with reference to the accompanying drawings. In the following description, thicknesses of lines or dimensions of components illustrated in the drawings may be exaggerated for convenience and clarity of description. Also, the terms used in the following description are terms defined taking into consideration the functions obtained in accordance with the present invention. The definitions of these terms should be determined based on the whole content of this specification as would be understood by a person of ordinary skill in the art, as opposed to a mere dictionary definition.

In the exemplary embodiment(s) of the present invention, it will be understood that the terms first, second, etc. may be used simply to discriminate the same name of objects from each other. Accordingly, the order of the objects may be optionally determined and a description of a preceding object may be applied to a subsequent object.

Now, an electronic device having an audio output unit according to the present invention will be described with reference to FIGS. 1 to 8.

FIG. 1 is an exploded perspective view schematically illustrating an electronic device having an audio output unit according to an exemplary embodiment of the present invention.

Referring now to FIG. 1, the electronic device 1 according to the exemplary embodiment of the present invention includes a housing 100, spaces 109 and 110 defined by the housing and a reinforcing member 200.

The spaces 109 and 110 are respectively referred to herein as first space 109 and second space 110, and are defined by the structure of the housing to serve as resonance spaces for resonance of sound output from an audio output unit 10 that is arranged within the second space 110. The first space 109 is configured to longitudinally penetrate at least an empty space among a peripheral space of the housing 100. The first space 109 is connected to the second space 110 in which the audio output unit 10 is mounted, such that the two spaces 109, 110 communicate with each other.

The term "peripheral space" refers to a region near the periphery of the housing 100 and the term "empty space" refers to all spaces in which internal modules inside the housing 100 (e.g., a camera, antenna and speaker) and the like are not mounted. In particular, the first space 109 is defined in a region in which no components are mounted on lines connecting the respective corners of the housing 100. At least one first space 109 may be formed during molding of the housing 100. In the present embodiment, a pair of first spaces 109 is formed respectively in opposite sides of the housing 100, and one end of each first space 109 is connected to the second space 110 in which the audio output unit 10 is mounted.

The second space 110 refers to a region in which internal modules are mounted via injection molding of the housing 100. In particular, the second space 110 refers to a space in which the audio output unit 10 is mounted. The second space 110 is connected, at opposite side positions of a lower end thereof, to the ends of the respective first spaces 109 formed in opposite sides of the housing 100. The electronic device 1 typically further includes a printed circuit board 20 configured to cover one surface of the housing 100, and a variety of modules is mounted on the printed circuit board 20. In the present exemplary embodiment, the second space 110 is located at an upper end of the housing 100 and has a greater size than the audio output unit 10. In this way, the second space 110 provides a resonance space in which the audio output unit 10 is mounted and sound generated from the audio output unit 10 can resonate. However, a person of ordinary skill in the art will appreciate that the position of the second space 110 is not limited to the above description and various other modifications are naturally possible so long as the second space 110 and the first space 109 are connected to each other.

The first space 109 may be integrally formed with the housing 100 during injection molding of the housing 100. More particularly, a portion of the housing 100 containing the first space 109 may be formed by, for example, gas injection molding. The first space 109 is configured to accommodate the reinforcing member 200 to reinforce the housing 100 that will be described hereinafter.

The housing 100 may be formed of a polycarbonate (PC), a composite of polycarbonate and glass fiber (GF), polyphthalamide or the like. Since the rigidity of the housing 100 is increased owing to the reinforcing member 200 that will be described hereinafter, the housing 100 may be formed, for example, of a material having a lower proportion of glass fiber under the assumption of a glass fiber composite.

Figure 2:
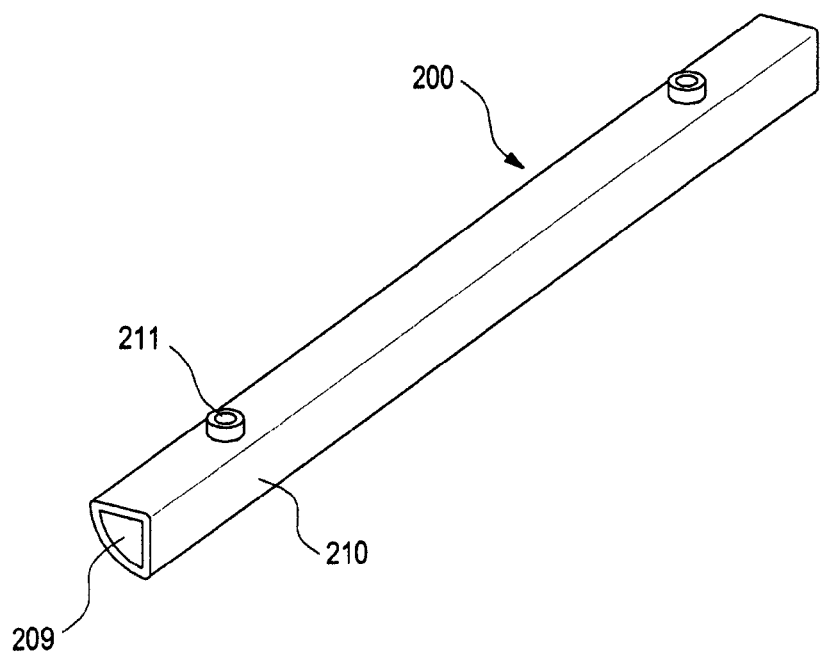
FIG. 2 is a perspective view illustrating a reinforcing member included in the electronic device having the audio output unit according to the exemplary embodiment of the present invention.
Figure 3:
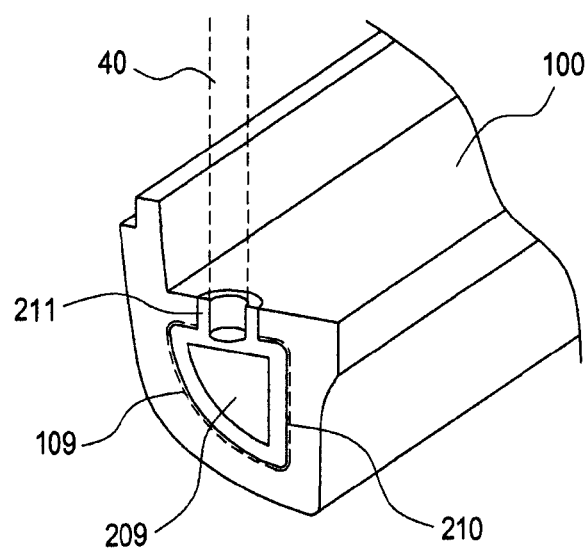
FIG. 3 is a perspective view illustrating a cross section taken along the line B-B' of FIG. 1.
Figure 4:
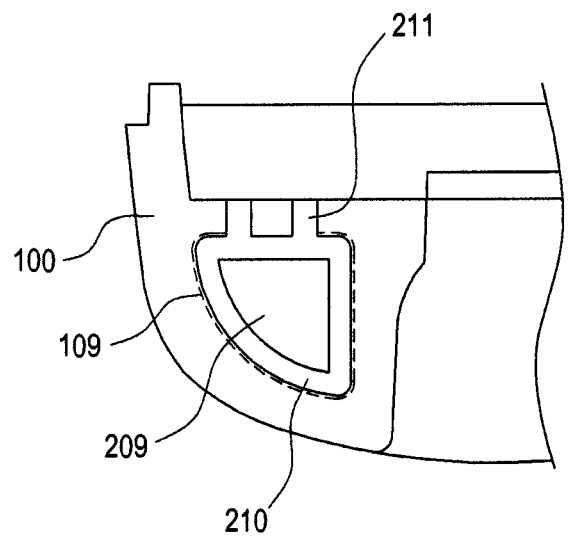
FIG. 4 is a sectional view taken along the line III-III of FIG. 1.

FIG. 2 is a perspective view illustrating the reinforcing member which is integrally injection molded with the housing 100 of the electronic device having the audio output unit according to the present embodiment, FIG. 3 is a perspective view illustrating a cross section taken along the line III-III of FIG. 1, and FIG. 4 is a sectional view taken along the line III-III' of FIG. 1.

Referring now to FIG. 2, the reinforcing member 200 is accommodated in the first space 109 to increase the rigidity of the first space 109 and to increase the rigidity of the housing 100. In the present exemplary embodiment, the reinforcing member 200 is described as being integrally formed with the first space 109 by way of example. However, a person of ordinary skill in the art will be appreciate that the present invention is not limited to the above description and various other modifications within the spirit of the invention and the scope of the appended claims are possible so long as an outer circumference of the reinforcing member 200 fixedly comes into close contact with the first space 109 and an inner circumference of the reinforcing member 200 defines a hollow to be connected to the second space 110. Here, the term "hollow" is understood by the person of ordinary skill in the art to be an empty space, and the empty space may be modified in various ways, for example, a circular shape or angled shape. The reinforcing member 200 includes a reinforcing member housing 210 configured to come into close (i.e. substantial) contact with the first space 109, and a bore 209 penetrating the interior of the reinforcing member housing 210. One end of the bore 209 is connected to the second space 110 so as to define a resonance space. In the present exemplary embodiment, although the reinforcing member 200 is described as being formed of a stainless steel (SUS) based metallic material, the material of the reinforcing member 200 is not limited thereto. For example, the reinforcing member 200 may be formed of any material capable of preventing the reinforcing member 200 from being deformed due to a molten material of the housing 100 injected into a mold during injection molding of the housing 100. That is to say, the material of the reinforcing member 200 may be modified in various ways so long as it increases the rigidity of the housing 100 and does not cause deformation during injection molding of the housing 100.

In the present exemplary embodiment, the reinforcing member 200 is inserted into the first space 109 during injection molding of the housing 100, thereby being formed by double injection molding. However, a person of ordinary skill in the art will be appreciate that a method of mounting the reinforcing member 200 in the first space 109 is not limited to the above description and various other modifications within the spirit of the invention and the scope of the appended claims are possible so long as the reinforcing member 200 is coupled into the first space 109 to reinforce the housing 100 and the bore 209 is connected to the second space 110.

Sound generated from the audio output unit 10 is introduced into the bore 209 through the second space 110 to thereby resonate in the bore 209.

As described above, the reinforcing member 200 is inserted during injection molding of the housing 100 so as to be integrally formed with the housing 100, preferably by double injection molding. To this end, the reinforcing member 200 is prefabricated by a certain process (e.g., injection molding, press molding or the like).

Referring now to FIGS. 3 and 4, at least one positioning guide 211 protrudes from an outer surface of the reinforcing member housing 210 such that a fixing pin 40 of a mold is fitted into the positioning guide 211. As the positioning guide 211 is secured to the fixing pin 40 of the mold, the reinforcing member housing 210 is positioned in the empty space 109 during injection molding of the housing 100. In other words, injection molding the housing 100 in a state in which the positioning guide 211 is secured to the fixing pin 40 ensures that the reinforcing member housing 210 is integrated with the first space 109 of the housing 100 and that one end of the bore 209 is positioned so as to be connected to the first space 110 (see FIG. 5).

As a result of providing the first space 109 with the reinforcing member 200 during injection molding of the housing 100, it is possible to prevent damage or deformation of the housing 100 caused primarily during injection molding of the housing 100 and secondarily when the housing 100 falls, bends or twists by external force applied thereto while a user is carrying the electronic device 1.

Figure 5:
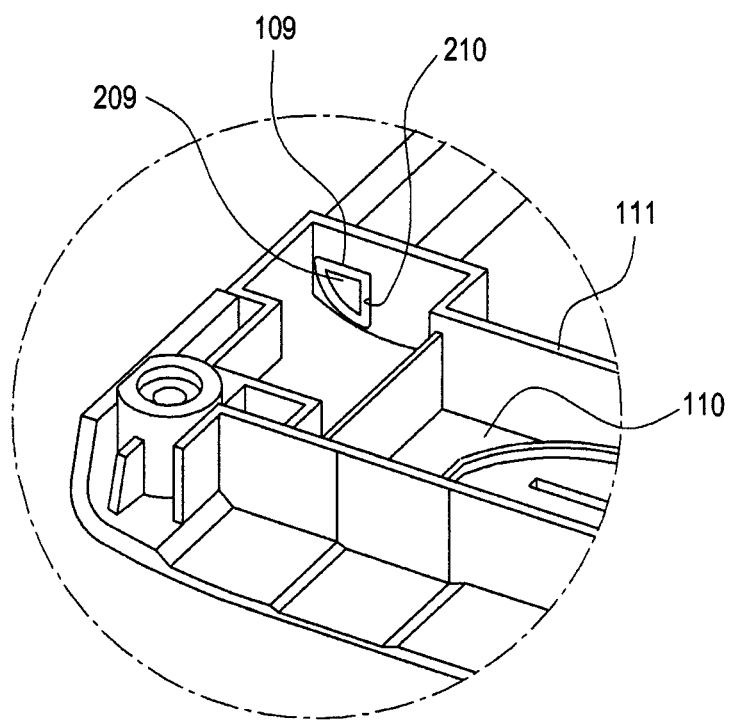
FIG. 5 is an enlarged view of the portion V of FIG. 1.
Figure 6:
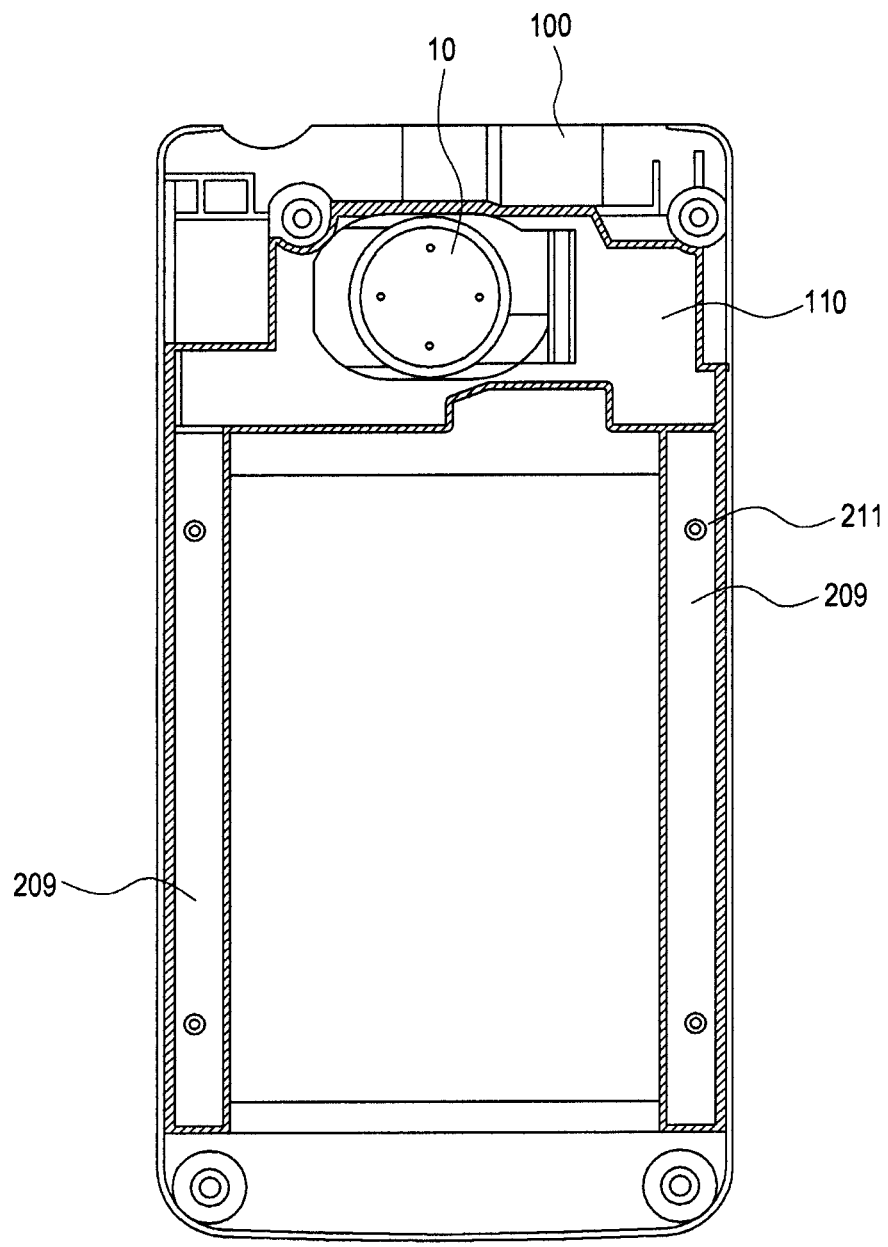
FIG. 6 is a plan view illustrating the electronic device having the audio output unit according to the exemplary embodiment of the present invention.

FIG. 5 is an enlarged view of the portion V of FIG. 1 and illustrates a connection relationship between the first space and the second space in the electronic device having the audio output unit according to the present exemplary embodiment. FIG. 6 is a plan view of the electronic device having the audio output unit according to the present exemplary embodiment and illustrates the audio output unit mounted in the second space of the electronic device that serves as a resonance space.

Referring to FIGS. 5 and 6, upon injection molding of the housing 100, a pair of the reinforcing member housings 210 comes into substantial contact with the respective first spaces 109 formed in opposite sides of the housing 100 and are oriented in a longitudinal direction of the housing 100. The ends of both the bores 209 are connected to the second space 110 at opposite side positions of the second space 110 and the bores 209 longitudinally communicate with the second space 110. With this configuration, the audio output unit 10 has an inverted U-shaped resonance space defined by the second space 110 and the bores 209. The resonance space for the audio output unit 10 is increased in volume in proportion to the volume of the bores 209. This increases the resonant volume of sound and consequently, increases the transmission distance of sound generated from the audio output unit 10, which may improve low frequency characteristics of the electronic device 1.

Figure 7:
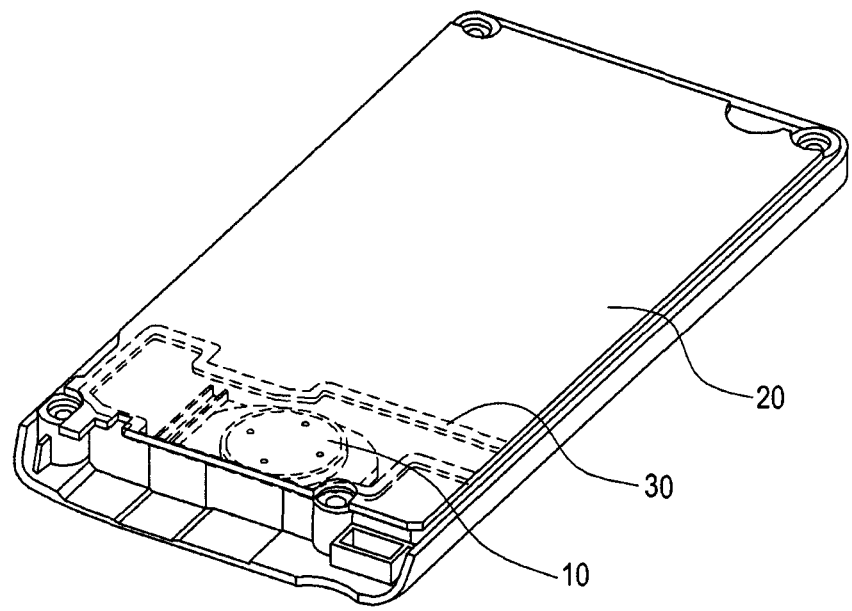
FIG. 7 is a view illustrating a coupling relationship between the audio output unit and the electronic device according to the exemplary embodiment of the present invention.

FIG. 7 is a view illustrating a state in which the audio output unit and the printed circuit board is installed to the housing of the electronic device according to the present exemplary embodiment.

Referring now to FIG. 7, the printed circuit board 20, on which Surface Mount Devices (SMDs) are mounted, is disposed on an inner surface of the housing 100. The audio output unit 10 is accommodated in the second space 110 and is connected to the printed circuit board 20 via a connector pin (not shown), or the like. A rib 111 (shown in FIGS. 1 and 5) vertically protrudes from the periphery of the second space 110 to define a space for accommodation of the audio output unit 10. Once the printed circuit board 20 has been placed on one surface of the housing 100, the printed circuit board 20 is oriented to face the rib 111, closing the second space 110.

A sound leakage preventing material 30 (also shown in FIG. 1) is interposed between the printed circuit board 20 and the rib 111 to fill a gap between the printed circuit board 20 and the rib 111, thereby preventing sound generated from the audio output unit 10 from leaking through the gap.

In the present exemplary embodiment, the sound leakage preventing material 30 is described as being an elastic material, such as sponge or the like, by way of example. However, a person of ordinary skill in the art will appreciate that the sound leakage preventing material 30 is not limited to the above description and may be selected from various other materials so long as they can preferably hermetically seal the second space 110 to prevent leakage of sound through the gap between the printed circuit board 20 and the rib 111.

Accordingly, as a result of integrally inserting the reinforcing members 200 into opposite sides of the housing 100 during injection molding of the housing 100, the rigidity of the housing 100 may be increased. According to the present invention, the reinforcing members 200 may prevent deformation of the housing 100 during injection molding of the housing 100 and also, may protect the housing 100 from bending or twisting due to external force applied to the housing 100, shock or the like. In addition, as a result of connecting the second space 110 to the bores 209 defined in the reinforcing members 200, sound generated from the audio output unit 10 can resonate via the bores 209 at opposite sides of the housing 100 as well as the second space 110 at the upper end of the housing 100. Thereby, the electronic device 1 may achieve enhanced sound quality.

Figure 8:
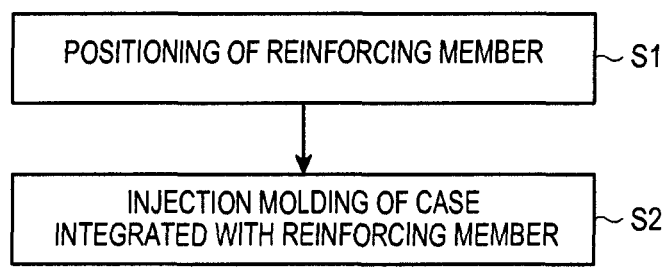
FIG. 8 is a block diagram schematically illustrating a manufacturing method of the electronic device having the audio output unit according to an exemplary embodiment of the present invention.

FIG. 8 is a block diagram schematically illustrating a manufacturing method of the electronic device having the audio output unit according to an exemplary embodiment of the present invention.

Referring now to FIG. 8, the housing 100 of the electronic device 1 according to the present invention is fabricated by injection molding.

To integrally form the reinforcing member 200 with the housing 100 simultaneously with injection molding of the housing 100, the prefabricated reinforcing member 200 is secured to the fixing pin 40 (FIG. 3) of the mold so as to be positioned in the empty space 109 (S1).

The prefabricated reinforcing member 200 includes the reinforcing member housing 210, the hollow bore 209 defined by the inner circumference of the reinforcing member housing 210 and the positioning guide 211 protruding from the outer circumference of the reinforcing member housing 210 so as to be secured to the fixing pin 40 of the mold. As the positioning guide 211 is secured to the fixing pin 40 of the mold, the reinforcing member 200 can be injection molded so as to be located in the first space 109 and to ensure that the bore 209 is connected to the second space 110. In this case, the reinforcing member 200 may be formed of a material having a higher fusing point than the material of the housing 100, which may prevent the reinforcing member 200 from being deformed by a molten material injected into the mold.

After operation S1, a synthetic polymer resin is injected into the mold to perform injection molding of the housing 100 (S2). In the present exemplary embodiment, the synthetic polymer resin includes polycarbonate (PC), a composite of polycarbonate and glass fiber (GF), polyphthalmide, or the like. This synthetic polymer resin is injected into the mold in a molten state. Specifically, the molten synthetic polymer resin is injected into the mold in a state in which the reinforcing member 200 is positioned at a predetermined position. Then, the housing 100, with which the reinforcing member 200 has been integrally formed, is separated from the mold. The separated housing 100 is subjected to cooling. In this way, the housing 100 with the increased rigidity owing to the reinforcing member 200 can be completed.

In the present invention, both the bores 209 are connected to the second space 110 to define an inverted U-shaped resonance space. Accordingly, sound generated from the audio output unit 10 can resonate through the second space 110 and the bores 209, which may result in enhanced sound quality.

As is apparent from the above description, an electronic device having an audio output unit according to the present invention includes a housing in which a second space for installation of the audio output unit and a first space connected to the second space are defined. Through provision of both the first and second spaces, a wide resonance space for the audio output unit may be provided, which results in higher sound volume and enhanced sound quality.

Further, inserting a reinforcing member into the first space to integrally form with the housing during injection molding of the housing may prevent deformation of the housing during injection molding.

Furthermore, as the housing is injection molded using polycarbonate or a polycarbonate composite containing a low content of glass fiber, the housing is substantially free from occurrence of cracks even if a shock force is applied thereto. Moreover, since the glass fiber is present in a low amount, the outer surface of the housing is easy to paint and the housing may achieve an aesthetically pleasing exterior design.

In particular, the reinforcing member integrally formed in the first space provided at either side of the housing may increase the rigidity of the housing and may protect the housing from deformation caused when the housing falls, bends or twists. In addition, the protection of components such as a display, printed circuit board, or the like that are mounted in the housing is possible, resulting in a reduced damage rate.

While the invention has been shown and described with reference to certain embodiments thereof, it will be understood by those skilled in the art that various changes in form and details may be made therein without departing from the spirit and scope of the invention as defined by the appended claims.

What is claimed is:

1. An electronic device having an audio output unit, comprising:
    a housing having:
        a first space therein longitudinally penetrating a side region of the housing, and
        a rib vertically protruding from an upper surface of the housing that defines a periphery of a second space, the second space arranged in a substantially lateral direction along the upper surface of the housing and communicating with the first space, and configured to receive the audio output unit arranged therein; and
    a reinforcing member including a hollow bore in acoustic communication with the second space, the reinforcing member circumferentially enclosed within the first space such that a longitudinally extending length of a surface of the reinforcing member is in direct contact with a portion of the housing defining the first space, the reinforcing member further providing at least one positioning guide extending from the longitudinally extending length of the surface of the reinforcing member to penetrate the portion of the housing defining the first space.

2. The electronic device according to claim 1, wherein the first space is defined along an unused edge of the housing.

3. The electronic device according to claim 2, wherein the first space is formed within the housing by molding from an injection mold or a gas injection mold, the positioning guide to receive a fixing pin of the injection mold or the gas injection mold during molding.

4. The electronic device according to claim 2, wherein reinforcing member is in direct contact with the portion of the housing defining the first space to structurally reinforces the housing.

5. The electronic device according to claim 4, wherein the reinforcing member is arranged in the first space upon injection molding of the first space so as to be integrally formed in the housing by double injection molding.

6. The electronic device according to claim 5, wherein the reinforcing member is formed of a stainless steel (SUS) based metallic material.

7. The electronic device according to claim 5, further comprising:
    a printed circuit board arranged in the housing, and
    a sound leakage preventing material interposed between the printed circuit board and the second space to seal hermetically the second space.

8. The electronic device according to claim 7, wherein the sound leakage preventing material includes an elastic material.

9. The electronic device of claim 1, wherein an opening acoustically connecting the hollow bore to the second space is formed at a first distal end of the reinforcing member, and a second distal end of the reinforcing member opposite the opening at the first distal end is acoustically closed.

10. An electronic device having an audio output unit, comprising:
    a housing;
    spaces defined in the housing, wherein the spaces include:
        a first space longitudinally penetrating a side region along a periphery of the housing, and
        a second space communicating with the first space and configured to accommodate the audio output unit therein; and
    a reinforcing member including a hollow bore in acoustic communication with the second space, the reinforcing member circumferentially enclosed within the first space such that a longitudinally extending length of a surface of the reinforcing member is in direct contact with a portion of the housing defining the first space to structurally reinforces the housing, the reinforcing member further providing at least one positioning guide extending from the longitudinally extending length of the surface of the reinforcing member to penetrate the portion of the housing defining the first space.

11. The electronic device according to claim 10, wherein the first space and second spaces comprise a resonance space in which sound output from the audio output unit resonates as defined by the hollow bore and the second space.

12. The electronic device according to claim 11, wherein an entirety of the longitudinally extending length of the surface of the reinforcing member directly contacts the portion of the housing defining the first space.

13. The electronic device according to claim 12, wherein the reinforcing member is arranged at least along one side of the housing and the hollow bore is acoustically connected to one end of the second space to permit sound generated from the audio output unit to resonate in the second space and the hollow bore.

14. The electronic device according to claim 13, wherein the reinforcing member is arranged in the first space upon injection molding, and is doubly injection molded.

15. The electronic device according to claim 14, wherein the reinforcing member is formed of a stainless steel (SUS) based metallic material.

16. The electronic device according to claim 14, further comprising:
    a printed circuit board arranged within the housing, and
    a sound leakage preventing material interposed between the printed circuit board and the second space to hermetically seal the second space.

17. The electronic device according to claim 16, wherein the sound leakage preventing material includes an elastic material.

18. The electronic device according to claim 11, wherein an opening acoustically connecting the hollow bore to the second space is formed at a first distal end of the reinforcing member, and a second distal end of the reinforcing member opposite the opening at the first distal end is acoustically closed.

* * * * *

UNITED STATES PATENT AND TRADEMARK OFFICE
CERTIFICATE OF CORRECTION

| | | |
|---|---|---|
| PATENT NO. | : 9,176,540 B2 | Page 1 of 1 |
| APPLICATION NO. | : 13/657948 | |
| DATED | : November 3, 2015 | |
| INVENTOR(S) | : Yun-Sung Shin | |

It is certified that error appears in the above-identified patent and that said Letters Patent is hereby corrected as shown below:

In the claims,

Column 9, Claim 4, Line 46 should read as follows:
--...to structurally reinforce the...--

Column 10, Claim 10, Line 21 should read as follows:
--...structurally reinforce the housing...--

Column 10, Claim 11, Line 27 should read as follows:
--...second space comprise a...--

Signed and Sealed this
First Day of March, 2016

Michelle K. Lee
*Director of the United States Patent and Trademark Office*